Jan. 1, 1929.

E. DANNER 1,697,227

SHEET GLASS FORMING APPARATUS AND METHOD

Original Filed Feb. 10, 1921   5 Sheets-Sheet 1

INVENTOR
Edward Danner.
By Owen Owen & Crampton,
Attys.

Jan. 1, 1929.  E. DANNER  1,697,227

SHEET GLASS FORMING APPARATUS AND METHOD

Original Filed Feb. 10, 1921    5 Sheets-Sheet 2

INVENTOR
Edward Danner
By Owen Owen & Crampton
Attys.

Jan. 1, 1929.

E. DANNER

1,697,227

SHEET GLASS FORMING APPARATUS AND METHOD

Original Filed Feb. 10, 1921   5 Sheets-Sheet 4

INVENTOR
Edward Danner,
By Owen Owen & Crampton
Attys.

Patented Jan. 1, 1929.

1,697,227

UNITED STATES PATENT OFFICE.

EDWARD DANNER, OF DETROIT, MICHIGAN.

SHEET-GLASS-FORMING APPARATUS AND METHOD.

Application filed February 10, 1921, Serial No. 443,752. Renewed June 27, 1927.

This invention relates particularly to the manufacture of sheet glass in continuous flat sheet form.

In the manufacture of sheet glass it is common to flow glass in shallow stream form through a tempering chamber wherein it is desired to bring the glass throughout its depth and width as nearly as possible to uniform temperature condition preparatory to forming the glass in sheet form. It is found in practice that the movement of the stream through the chamber is more or less sluggish at its side edge portions due to the frictional resistance of the side walls of the chamber thereon and also to the tendency of the glass to cool at its edges by contact with the walls.

An object of my invention is the provision of a furnace construction whereby the glass stream flowing through the tempering chamber is surrounded by a heating space to maintain the side walls at a predetermined temperature and thereby prevent cooling of the side edges of the stream by reason of its contact with the chamber walls.

A further object of the invention is the provision of certain improvements in the apparatus for vertically drawing or flowing glass in sheet form down opposite sides of a slab or directing member disclosed in Fig. 12 of my former U. S. Letters Patent No. 1,261,367, and in some of the forms contained in my Patent No. 1,555,358 issued September 29, 1925. Claims broad to this invention are included in a copending application Serial No. 722,899, filed June 28, 1924, which is a division of said Patent No. 1,555,358, and failure to make such claims herein is not to be construed as an abandonment of the broad invention.

A further object of the invention is the provision of means on the discharge end of the directing slab or member down which the glass passes and from which it flows in sheet form, whereby the narrowing in of the sheet as it flows from the slab or member is reduced to a minimum.

Further objects and advantages of the invention will be apparent from the following detailed description thereof.

The invention is fully described in the following specification, and while in its broader aspect it is capable of numerous changes, a preferred embodiment thereof, and some modifications are illustrated in the accompanying drawings, in which,—

Figure 1 is a central vertical longitudinal section of a furnace embodying the invention, with parts thereof broken away. Fig. 1ª is a cross-section on the line 1ª—1ª in Fig. 1. Fig. 2ª is a section on the line 2ª—2ª in Fig. 2.

Referring to the drawings, 1 designates a furnace or tank containing the molten glass supply and which may constitute the melting tank of a furnace or the refining tank thereof, 2 a horizontal spout forming the main tempering chamber through which the glass flows from the tank 1 in a relatively thin stream to a hopper 3 formed in the bottom of the chamber at its forward end and having a narrow bottom discharge slot 4 through which the glass flows down onto a vertically disposed directing slab or member 5, the glass thence flowing down the slab and from the lower end thereof in properly regulated sheet form.

The tempering chamber 2 is preferably provided near its rear end with a gate 6, which is suitably suspended to enable it to be raised and lowered as it may be desired to regulate the depth of the glass stream flowing through the chamber. This gate may be used as a curtain or wall to separate the furnace and tempering chamber so that two different temperatures may be maintained therein, or it may be adjusted to regulate the temperatures of the furnace and chamber in proper relation to each other, as the desired flowing conditions of the glass may require. A gate 7 may be suspended in the front end portion of the tempering chamber 2 to separate the major part thereof from the hopper 3, and this gate may serve both to regulate the thickness of the glass stream flowing into the hopper 3 from the chamber 2, and to control the heat in the forward end of the chamber. The gate 7 in the present instance is shown as comprising a plurality of slabs, which are suspended by any suitable means for relative adjustment to permit a varying of the thickness of the glass stream throughout its width, as described in my former application, Ser. No. 405,322, filed Aug. 27, 1920. One or both side walls of the chamber 2 at the top portions thereof are preferably provided with openings 8 to the outside atmosphere, which may be filled with loose blocks and one or more left open as it may be desired to regulate the temperature within the chamber 2. One or more burners 9 may also be projected through these openings into the chamber to assist in maintaining a desired temperature therein.

The furnace structure 10 in which the tempering chamber 2 is formed is of greater width and length than said chamber to provide a heating space or flues 11 between the outer side of each side wall 12 of the tempering chamber and the outer side wall of the furnace structure 10. The structure also provides a cross-flue 13 at the forward end of the tempering chamber. Burners are projected into the flues 11 and 13 through openings 14 in the outer walls of the structures 10 so that the heat within the flues may be maintained at the desired temperature for heating the side and front walls of the chamber 2. Burners may be introduced into the forward end of the chamber 2 over the hopper 3 through front openings 15. The heating of the side walls 12 of the chamber 2 in this manner prevents a cooling of the side edge portions of a glass stream flowing through the chamber 2 so that the temperature of the stream at its edge portions is maintained the same as the temperature of the stream near its center. This is found in practice to be quite an important feature, as the cooling of the glass stream along its side edges tends to retard the flowing of the stream at its edge portions and this in turn tends to cause a devitrification of the glass at such points.

Figure 3:
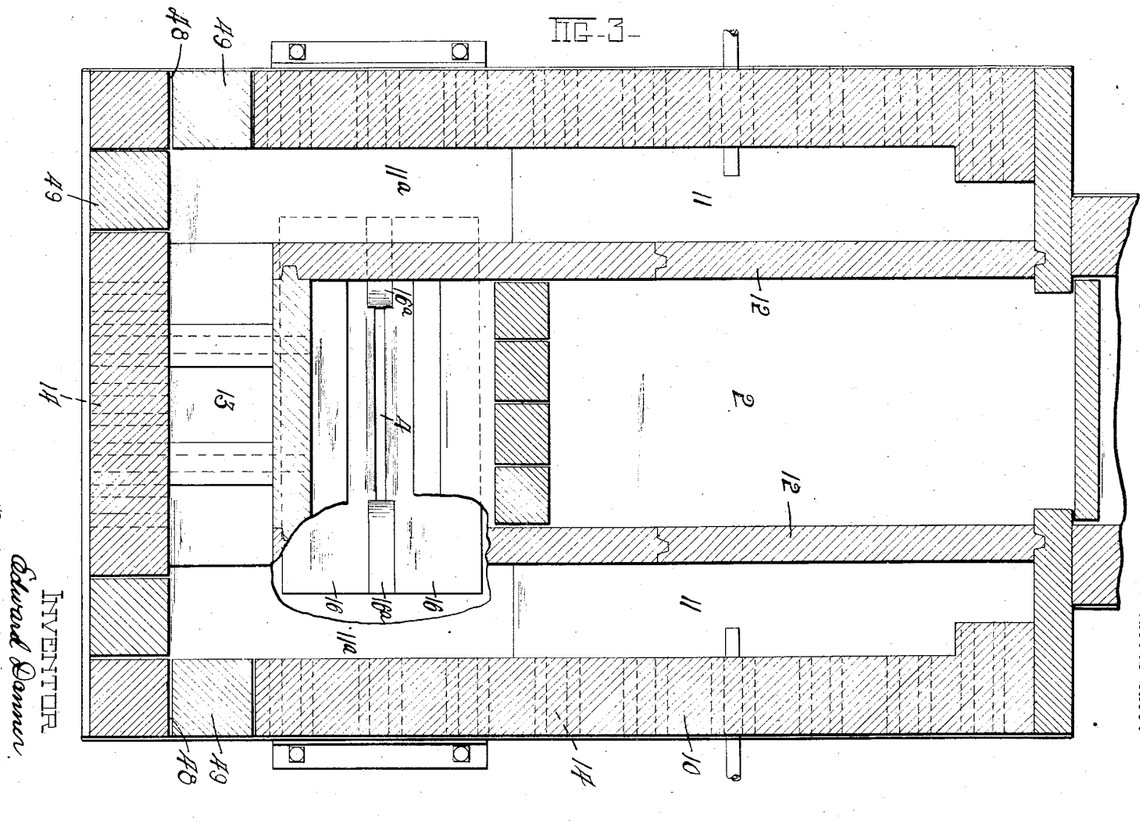
Fig. 3 is a horizontal section on the line 3—3 in Fig. 1, with parts broken away.

The slab or member 5 is mounted in vertical position below the discharge slot 4 of the hopper and has its top of greater width than the width of the slot and disposed so that the glass flows from the slot down onto the slab top substantially midway between its side edges and then divides and flows in separated films down opposite sides of the slab. The films which flow down at opposite sides of the slab merge at the discharge end thereof and flow therefrom in the form of a single sheet $a$ with the outer sides of the films forming the outer sides of the sheet as described in my said former patents and applications. The thickness of the glass films flowing down the opposite sides of the slab is determined by the spacing of the slab top from the overhanging lip portions of the bottom slabs 16 of the hopper 3, which latter slabs cooperate to form the slot 4. The slabs forming the slot 4 and bottom of the hopper are four in number, in the present instance, and comprise the two opposed side slabs 16 and the opposed end slabs 16$^a$, which latter are of narrow form, as shown in Fig. 3. It is evident also that the thickness of the films is regulated by the temperature of the glass and the quantity in the hopper 3.

The slab 5 is disposed within a heated chamber 17, which may be termed a drawing chamber, although the sheet may flow freely from the slab 5 without exerting a drawing tension thereon other than the tension which is exerted by the gravity of the flowing sheet. The wall of the chamber 17 is formed, in the present instance, by a plurality of built up sections and may be shortened or lengthened as desired. The top section 18 of the chamber wall is of rectangular form and bears upward against the outer edge portions of the bottom slabs 16 and 16$^a$ of the hopper 3 to hold them against the bottom structure 10. This frame section has arms 19 projecting from the ends thereof and adjustably suspended by bolts 20 from an edge iron 21 at the lower side edges of the furnace structure 10. The section 18 has a plurality of threaded rods 22, four in the present instance, extending downward from each end thereof and adapted to engage and carry the subjacent wall sections of the chamber 17. The upper one of these sections is designated 23 and comprises side blocks 24, each supported by a metal side frame member 25 to which the blocks are bolted or otherwise suitably secured and having an inwardly disposed bottom ledge extending under the lower edge of the block in supporting relation thereto. The ends of the frame members 25 are provided with apertured lugs 26 through which a respective rod 22 passes, the lugs resting on nuts 27 threaded on the rods. The ends of the section 23 are formed by U-shaped metal brackets 28 mounted at their ends on a pair of intermediate rods 22 of each set, and having a ledge 29 projecting inwardly therefrom to serve as a support for the side edge extensions 30 at the upper end of the slab 5, which extensions have their outer ends tapered outward and downward to adapt them to project out into the space between the legs of the bracket 28.

Figure 6:
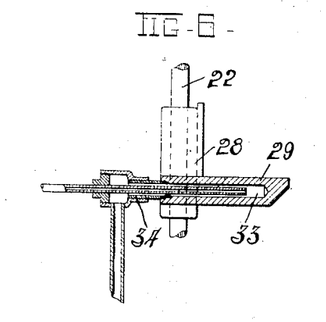
Figs. 6, 7 and 8 are different details, with the former in section, of the slab supporting brackets.
Figure 7:
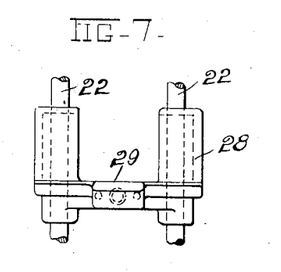
Figure 8:
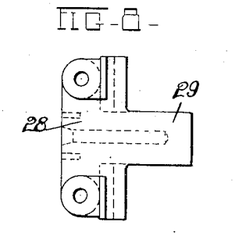
Figure 9:
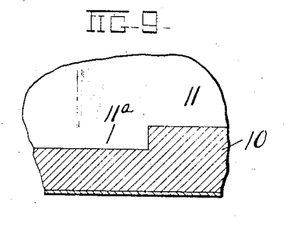
Fig. 9 is a fragmentary sectional view of the heating flue or passageway at the outer side of the side wall of the tempering chamber.

The space between the sides of the extensions 30 and the side blocks 24 of the section 23 are filled by a pair of blocks 31 and 32 at each side, the blocks 32 being of a size substantially equal to that of the slab extension 30. The inner edges of the blocks 32 substantially align with the longitudinal side edges of the slab 5 and with the end edges of the hopper discharge slab 4 to form guide shoulders for preventing the glass flowing down the side surfaces of the slab from spreading over the extensions 30 thereof. The ledge 29 of each bracket 28 may be water cooled and for such purpose is provided with a socket 33 having a water circulating means 34 (Fig. 6) connected therewith.

The remaining wall sections 35 of the chamber 17 are in abutment, one with another, and the upper one is in contact at its upper edge with the lower edge of the section 23, such sections being carried by the rods 22. Each of these sections is provided with side frame members 36, the same as the members 25 of the section 23, which members 36 support side blocks 37. An end frame member 38 is provided at each end of the section between the respective end portions of the members 36, and these carry end blocks 39 on their inturned bottom edges. The members 36 and 38 have apertured lugs 40 projecting therefrom for receiving the rods 22 on which supporting nuts 27 are threaded for the different sections. It is evident that the wall forming the chamber 17 may be lowered as a unit on the supporting bolts 20 when it is desired to replace the bottom slabs 16 and 16ᵃ of the hopper 3. The spacing between the end lips of the hopper bottom and the upper edges of the slab extensions 30 are closed by filler strips 41, thereby preventing the molten glass from flowing over the tops of said extensions.

Figures 1, 1A:
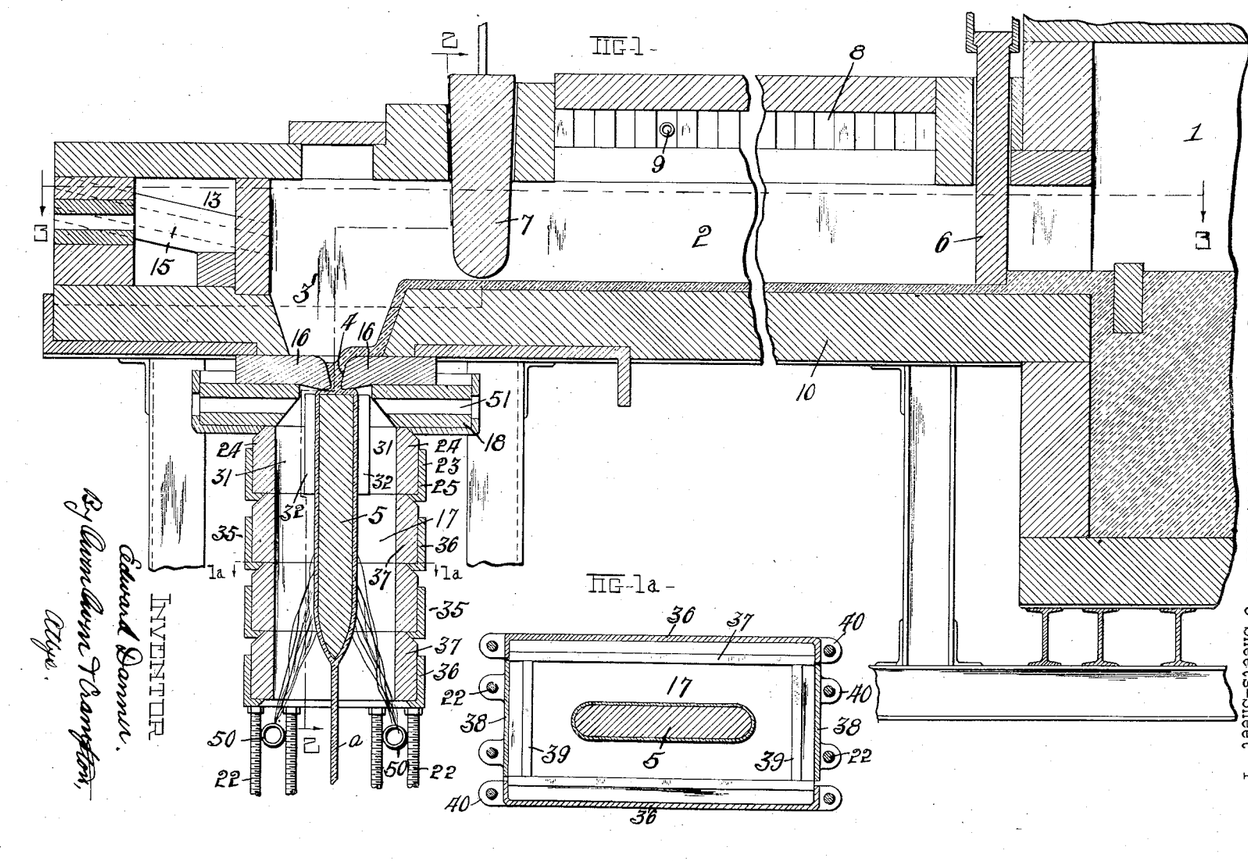
Figure 2:
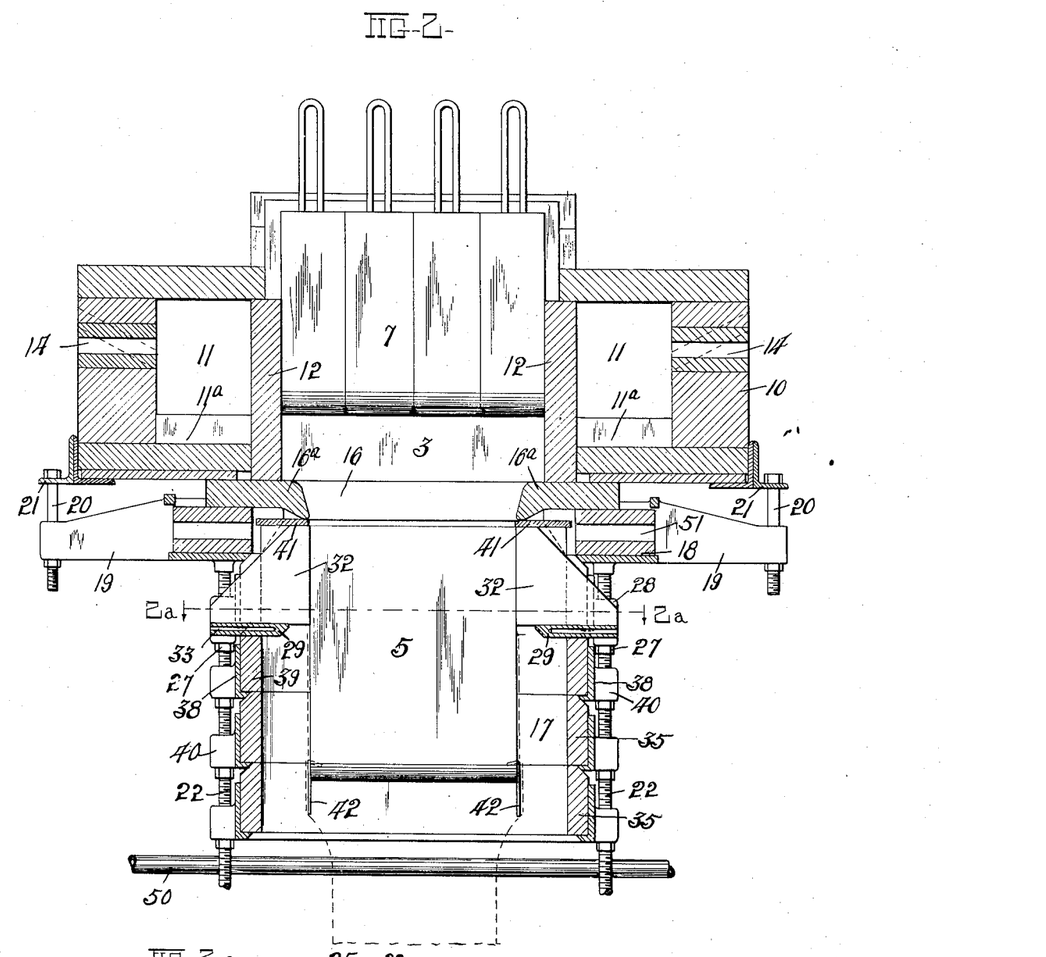
Fig. 2 is a vertical section on the line 2—2 in Fig. 1, with parts in full.
Figure 2A:
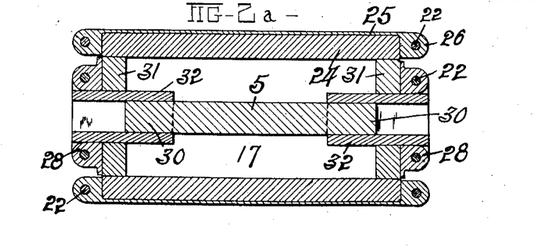
Figure 4:
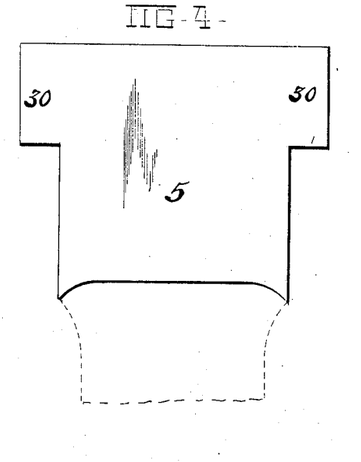
Figs. 4 and 5 are elevations of the sheet forming slabs with their discharge ends differently fashioned to tend to prevent narrowing in of a sheet flowing therefrom.
Figure 5:
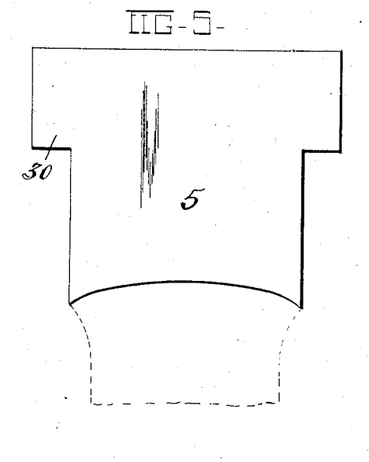

In Fig. 2 the slab 5 is provided at the side edges of its discharge end with fingers 42 which project below the slab end and prevent an immediate drawing in of the side edges of the sheet as it flows from the slab. When the glass has reached the lower ends of the fingers 42, which may be termed width maintaining fingers, it has been cooled or congealed sufficiently to prevent the glass from drawing in as much as would be the case if it were free to draw in immediately upon flowing from the slab. It is found in practice in the drawing or flowing by gravity of glass from a slab 24 inches in width, that its tendency is to draw in approximately six inches at each edge and that this sometimes causes the glass to have a wavy appearance. By the use of width maintaining fingers or some other means at the edges of the discharge end of the slab it was found that the drawing in tendency was reduced approximately one-half and the waves or wrinkles entirely eliminated from the surfaces of the sheet. It is preferable in the use of width maintaining fingers of this nature to have the glass flow from the slab in enveloping relation to the fingers, and this is accomplished by permitting the glass films at the opposite sides of the slab to flow around the edge portions of the slab near its discharge end so that the films meet at their edges and envelop the fingers 42. In each of Figs. 4 and 5 the discharge end of the slab is made concaved lengthwise thereof so as to provide integral extensions at their ends which act in the same or a similar manner to the fingers 42.

Figures 10, 11, 12:
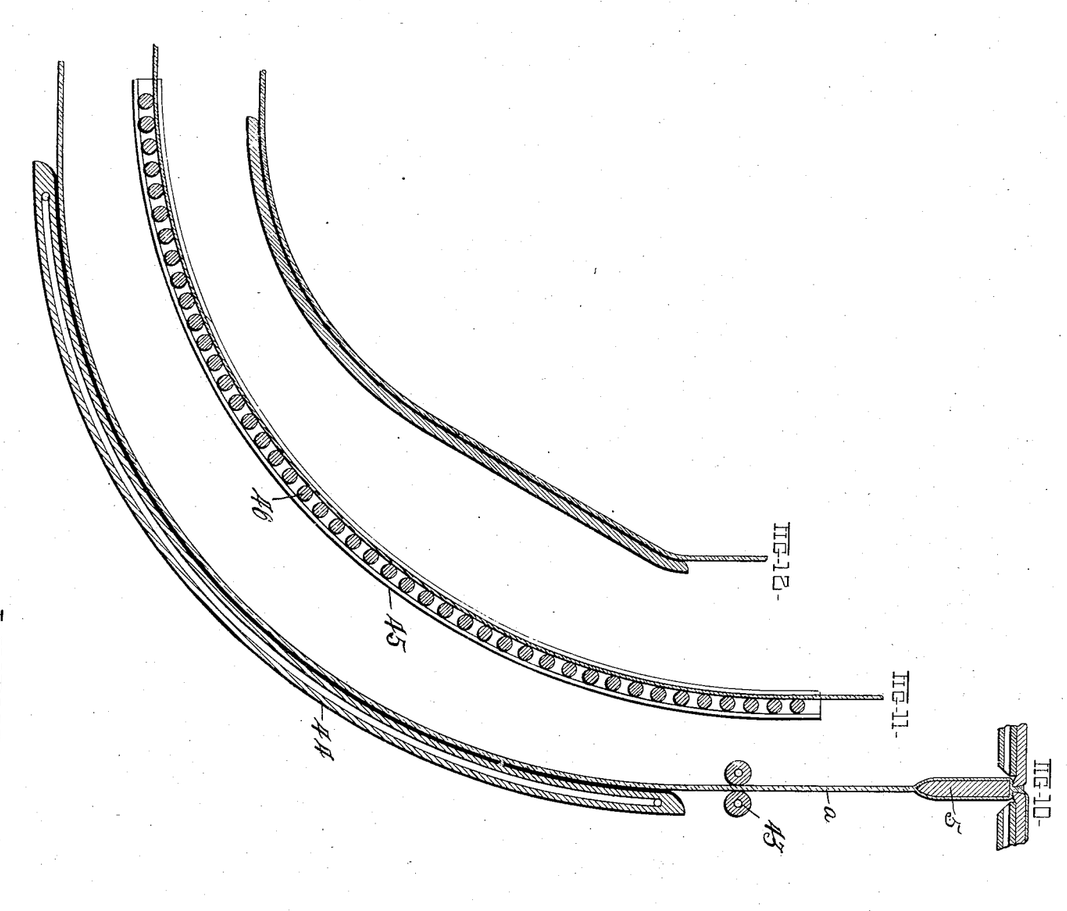
Fig. 10 is a vertical section of a sheet deflecting means in operative relation to a sheet forming slab.
Figs. 11 and 12 are sectional views of different forms of such deflecting means.

In Fig. 10 the sheet flowing from the directing or forming slab 5 is shown as being engaged at opposite sides thereof and at a distance below the directing slab by a set of opposed rollers 43, the speed of rotation of which is regulated in any suitable manner to cause the rollers to regulate the speed of flowing of the glass from the slab. While these rollers may be used if desired to apply a slight drawing tension on the sheet, it is found in practice that it is desirable to employ the same to partially support the weight of the sheet and retard the flowing action thereof, as otherwise the weight of the sheet is such as to cause the sheet to flow at too great a speed and to be thinned too great an extent.

It is desirable in flowing a sheet vertically from the directing slab to change the course of the sheet from a vertical to a horizontal so that it may be passed in continuous sheet form through a horizontally disposed leer. Such deflection of the sheet, however, has in some cases been objectionable due to the tendency it has to wrinkle the sheet by reason of the stretch which it gives to one surface skin and the compressing action which it gives to the other. I have found that such objection, if present, may be overcome by gradually changing the course of the sheet throughout a long range, as the sheet, after being set, will flex sufficiently, without breaking, to permit the change in its course of movement from a vertical to a horizontal. I have found by experiments that single strength window glass can be deflected through a curve of substantially a 20 foot radius without breaking the glass. I have therefore provided a curved deflecting slide 44 having a radius of substantially 20 feet and being disposed in position to engage the sheet at a point below the rolls 43 and to change its course of movement from a vertical to a horizontal. It will be understood, however, that this radius may be changed to suit the thickness of the glass. This slide is preferably water cooled and has its sheet coacting surface of a graphitic composition to adapt the glass to slide freely thereon and to prevent scratching. In Fig. 11 a slide adapted for this purpose is designated 45 and is provided with rollers 46 instead of with the smooth sliding surface for coaction with the sheet. In Fig. 12 the slide has successive straight and curved portions, but the curves are of such a nature as to impart a gradual flexing to the sheet. The deflecting means may be disposed in the entrance end of the leer.

In the use of my invention the glass is permitted to flow in a regulated stream from the furnace or supply tank 1 through the tempering chamber 2 and into the hopper 3 from whence it flows through the bottom slot 4 down on to the top of the subjacent slab 5 and thence divides and flows in separated films down the opposite sides of the slab, the films then merging at the discharge end of the slab and flowing therefrom in single sheet form. The side walls 12 of the chamber 2 are heated by radiant heat from the side flues 11 so as to prevent a cooling and sluggish action of the glass stream at the side edges thereof which have contact with said walls. If some of the molten glass should flow from the chamber 2 through crevices or cracks in the side walls thereof into the flues 11, such glass will gather in the pockets 11ª in the forward ends of the flue bottoms and may then be removed therefrom through openings 48 in the wall 10, which openings are closed by removable blocks 49. The drawing chamber 17 in which the slab is disposed is heated to the desired temperature by flames from subjacent burners 50, which flames play against the outer sides of the glass films flowing down the slab 5 to give the same a fire finish, as described in connection with my said former applications and patents. The films of glass as they flow down the slab pass around and meet at the side edges of the lower end portion of the slab and thence envelop the width maintaining fingers 42 or other projections at the lower end edges of the slab so that the projections are caused to maintain the sheet in its full width for a predetermined distance of its movement after leaving the slab and until the glass has become somewhat cooled so that the drawing in tendency thereof as it flows from the projections will not be as great as it would have been at the end of the slab. The drawing chamber 17 may have outlet passages or flues 51 at its top.

I wish it understood that my invention is not limited to any specific construction, arrangement or form of the parts, as it is capable of embodiment in numerous forms without departing from the spirit of the claims.

Having thus described my invention, what I claim as new and desire to secure by Letters Patent, is,—

1. In an apparatus for forming sheet glass, means forming a horizontally disposed tempering chamber through which molten glass flows in a shallow stream from a source of supply to a discharge point and also forming flues at the outer sides of the side walls of the tempering chamber, and means for heating the flues.

2. In an apparatus for forming sheet glass, a source of molten glass supply, means forming a horizontal spout from the source of supply to a point of discharge with the interior of the spout forming a tempering chamber, and means forming heating flues at the outer sides of the spout to heat the side walls thereof.

3. In an apparatus for forming sheet glass, means through which glass flows from a source of supply and having a bottom discharge opening, a slab subjacent to the opening in vertically spaced relation to its lower marginal edge walls whereby the glass flows from the opening down onto the top of the slab and thence divides and flows in separated films down opposite sides of the slab, the discharge end of the slab being fashioned to cause a merging of the films in single sheet form as they flow therefrom.

4. In an apparatus for forming sheet glass, means for containing molten glass and having a bottom discharge opening, a vertically disposed slab disposed below the opening in position for glass to flow therefrom down on to the top of the slab and thence to divide and flow in separated films down opposite sides of the slab, the films merging and flowing in single sheet form from the lower end of the slab, and means forming a heated drawing chamber in which the slab is disposed.

5. In an apparatus for forming sheet glass, a molten glass supply means having a bottom opening, bottom slabs closing said opening except for a restricted discharge slot and having lower lip edges, a heated chamber disposed below said slot in communication therewith, and a member mounted in the chamber with its upper end disposed below and of greater width than the slot and being vertically spaced from the lips of the bottom slabs whereby glass flows from the slot down onto the member top and thence divides and flows in separated films down opposite sides of the member, the films merging and discharging in single sheet form from the lower end of the member.

6. In an apparatus for forming sheet glass, means for containing molten glass and having a bottom discharge opening, means extending downward from the opening onto and down which glass flows from the opening and from which it flows in sheet form, and a sectional built up wall suspended from the first means and forming an open-bottom heated drawing chamber around the second means.

7. In an apparatus for forming sheet glass, means forming a chamber having an opening in its bottom from which molten glass may flow, a slab like member down opposite sides of which the glass flows from the opening and from which it is discharged in single sheet form, a plurality of rods suspended from the means, and a plurality of wall sections suspended in superimposed relation by the rods around the slab member and removable in successive order from bottom to top from the rods.

8. In an apparatus for forming sheet glass, means forming a chamber for containing molten glass and having a discharge opening in its bottom, means forming an open bottom drawing chamber below said opening in communication therewith, a slab disposed within the drawing chamber in position for glass to flow on to its top from the opening and thence in separating films down opposite sides thereof and in single sheet form from its discharge end, the slab having side extensions at its upper end supported by the means forming the drawing chamber.

9. In an apparatus for forming sheet glass, a chamber for containing molten glass and having a discharge opening in its bottom, means forming an open bottom drawing chamber below said opening in communication therewith and having bracket members at opposite sides thereof, a slab disposed within said chamber and having side extensions near its top resting on said brackets, said slab being in the line of discharge of glass from the opening, whereby the glass flows down the same and is discharged therefrom in single sheet form.

10. In an apparatus for forming sheet glass, a slab down and from which molten glass flows in sheet form, said slab having integral extensions at the opposite ends of its discharge edge which project in the direction of flow of a sheet therefrom.

11. In an apparatus for forming sheet glass, a slab down and from which molten glass flows in sheet form, the discharge end edge of the slab being concaved lengthwise thereof to provide extensions at the end portions of such edge.

12. In an apparatus for forming sheet glass, a vertically disposed slab down which molten glass flows in separated film form with the films merging around the side edges thereof and flowing from the discharge end of the slab in single sheet form, said slab having extensions at the opposite edges of its discharge end which are enveloped by the glass flowing down the edge portions of the slab and which project from the slab in the direction of flow of the glass therefrom to prevent a drawing in of the sheet edges until the glass is a predetermined distance from the major portion of the discharge end of the slab.

13. In an apparatus for forming sheet glass, means for directing the flow of a glass stream in sheet form, a curved deflecting member subjacent to the discharge end of the means, for co-acting with the flowing sheet after it is set and deflecting its course from a vertical to a horizontal, the radius of the member curve being substantially 20 feet.

14. In an apparatus for forming sheet glass, means for directing the flow of a glass stream and from which the glass flows by gravity in sheet form, means for regulating the speed of flow of the glass from the directing means and having contact with the glass after it has become substantially set, and means below the regulating means for deflecting the sheet from a vertical to a horizontal, the deflection being carried out throughout a long length whereby a breaking of the set glass by reason of the deflection is prevented, said deflecting means having a plurality of successively positioned rollers on its curved surface for coacting with the sheet.

15. In an apparatus for forming glassware, means forming a single orifice from which molten glass flows downward from a supply, a directing member extending downward from a point below said orifice, the upper end of the member being in the path of discharge of glass from the orifice and of a width greater than that of the orifice, the glass flowing laterally in different directions from its point of initial flow onto the member and down opposite side portions of the member, and from the lower end thereof in unitary form.

16. In an apparatus for producing sheet glass, means forming a discharge slot from which molten glass flows downward from a supply, a directing means onto the top of which glass flows from said slot and having opposite side surfaces down which the glass flows in film form from the top of the directing means, the top of said directing means and the slot forming lip portions of the first means cooperating to determine the thickness of the films.

17. In an apparatus for producing sheet glass, means having a top end surface and a side surface extending down from the top surface, and means forming a slot through which molten glass flows from a supply down onto the top surface of said first means, the glass then flowing in film form over an edge of the top surface and down the side surface of the first means and from its lower end, the first means cooperating with a portion of said second means to gage the thickness of the film.

18. In an apparatus for producing sheet glass, means forming a discharge slot from which molten glass flows downward from a supply, a directing member extending downward from a point below said slot, the top surface of the member being spaced below said slot and in the path of discharge of glass from the slot and of a width greater than that of the slot, a portion at least of the glass flowing laterally over a top edge of the member and in sheet form down and from a side surface thereof.

19. In an apparatus for producing sheet glass, means forming a discharge slot from which molten glass flows downward from a supply, a directing member extending downward from a point below said slot, the top surface of the member being spaced below said slot and in the path of discharge of glass from the slot and of a width greater than that of the slot, the glass stream dividing as it strikes the top of the member and flowing laterally over both side edges thereof and in film form down both sides of the member.

20. In an apparatus for producing sheet glass, means forming a discharge slot from which molten glass flows downward from a supply, a directing member extending downward from a point below the slot, the upper end of the member being in the path of discharge of glass from the slot and being of a width greater than that of the slot, a portion at least of the glass flowing laterally over a top edge of the member and in sheet form down and from a side surface thereof, an edge wall of the slot and the upper end of the member cooperating to gage the thickness of the glass stream flowing therebetween.

21. In an apparatus for producing sheet glass, means forming a discharge slot from which molten glass flows downward from a supply, a directing member extending downward from a point below said slot, the upper end of the member being in the path of discharge of glass from the slot and of a width greater than that of the slot, the glass stream dividing as it strikes the top of the member and flowing laterally over both side edges thereof and in film form down both sides of the member, the lower marginal edge walls of the slot cooperating with the member top to gage the thickness of the glass films flowing down the member.

22. In an apparatus for producing sheet glass, a member having downwardly converging exterior surfaces, means forming a slot in position to discharge a stream of molten glass from a supply onto the upper end of said member, the top surface of said member being spaced below said slot, the glass then flowing in divided films down both exterior surfaces of the member and merging in a single sheet at the lower ends of said surfaces.

23. In an apparatus for producing sheet glass, a wedge shape member with its apex downward, and means forming a slot in position to discharge a stream of molten glass onto the upper end of said member so that the glass will flow down both sides of the member and from the lower end thereof in single sheet form, the top surface of said member being spaced below said slot.

24. In an apparatus for producing sheet glass, a wedge shape member with its apex downward, and means forming a slot in position to discharge a stream of molten glass onto the upper end of said member so that the glass will flow down both sides of the member and from the lower end thereof in single sheet form, the top surface of said member being spaced below said slot and cooperating with said means to gage the thickness of the glass films flowing down the sides of the member.

25. In the art of producing sheet glass, the process of generating a sheet of glass from its molten source in a vertical direction until substantially set, and then bending the sheet into another plane along an arc of such curvature that the bending strains will not exceed the elastic limit of the sheet.

26. In the art of producing sheet glass, the process of flowing a sheet of glass from its molten source in a vertical direction until substantially set, and then bending the sheet gradually into another plane, the curvature at no time being sufficient to overcome the elastic limit of the sheet.

27. In the art of producing sheet glass, the process of generating the sheet from its molten source in a vertical direction until set in flat sheet form and then gradually bending the sheet into another plane within its limit of elasticity without destroying the established flatness of the sheet.

28. Apparatus for making sheet glass comprising means forming a source for molten glass and from which the glass flows downward in sheet form, and means for changing the course of the sheet after becoming set from substantially a vertical to substantially a horizontal plane, said last means effecting a gradual bending of the sheet against its own elasticity and within the limit of such elasticity during the changing of its course from one plane to the other.

29. The combination with means forming a source of molten glass from which a sheet of glass is generated and moves vertically, of guide means for changing the course of movement of the sheet from a vertical to substantially a horizontal plane after the sheet has become substantially set, said guide means describing a curve the radius of which is such that a gradual bending of the sheet within the limits of its elasticity is effected.

30. In an apparatus for making sheet glass, a vertically positioned slab, having downwardly converging sides, and a curved lower edge at which the converging sides meet.

31. In an apparatus for making sheet glass, a vertically positioned slab, having downwardly converging sides, and a curved lower edge at which the converging sides meet, in combination with means for flowing molten glass onto and down the sides of the slab, and means for drawing this glass downwardly from the curved lower edge in sheet form.

In testimony whereof, I have hereunto signed my name to this specification.

EDWARD DANNER.